US010464793B2

(12) United States Patent
Schmalzl et al.

(10) Patent No.: US 10,464,793 B2
(45) Date of Patent: Nov. 5, 2019

(54) INDUSTRIAL TRUCK COMPRISING A DEVICE FOR REDUCING VIBRATIONS

(71) Applicant: Jungheinrich Aktiengesellschaft, Hamburg (DE)

(72) Inventors: Jürgen Schmalzl, Haimhausen (DE); Hubert Bibernell, Landshut (DE); Carsten Schöttke, Moosburg (DE); Ernst-Peter Magens, Ammersbek (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 25 days.

(21) Appl. No.: 15/610,753

(22) Filed: Jun. 1, 2017

(65) Prior Publication Data
US 2017/0349418 A1 Dec. 7, 2017

(30) Foreign Application Priority Data

Jun. 6, 2016 (DE) .................. 10 2016 209 893

(51) Int. Cl.
*B66F 9/06* (2006.01)
*B66F 9/075* (2006.01)
(Continued)

(52) U.S. Cl.
CPC ............ *B66F 9/07504* (2013.01); *B66F 9/06* (2013.01); *B66F 9/07* (2013.01); *B66F 9/075* (2013.01);
(Continued)

(58) Field of Classification Search
CPC ....................................................... B66F 9/06
(Continued)

(56) References Cited

U.S. PATENT DOCUMENTS

| 3,561,628 A | 2/1971 | Melin |
| 3,937,346 A * | 2/1976 | van der Laan ........... B66F 9/06 |
| | | 414/666 |

(Continued)

FOREIGN PATENT DOCUMENTS

| CN | 105668462 | 6/2016 |
| DE | 2512521 | 9/1976 |

(Continued)

OTHER PUBLICATIONS

German Application No. 10 2016 211 603.7, German Search Report dated May 29, 2017.
(Continued)

*Primary Examiner* — Saul Rodriguez
*Assistant Examiner* — Willie Berry, Jr.
(74) *Attorney, Agent, or Firm* — Kilpatrick Townsend & Stockton LLP

(57) ABSTRACT

An industrial truck is described, the industrial truck comprising a chassis,
a mast arranged on the chassis in an upright position, a load-carrying apparatus, which is configured for receiving a load that is to be transported,
a support structure that supports the load-carrying apparatus on the mast and can be moved, together with the load-carrying apparatus, upwards and downwards on the mast, and comprising
a device for reducing vibrations,
wherein the device for reducing vibrations has at least one additional mass body, which is supported by the mast or the components connected thereto and is not constantly rigidly coupled to the mast or the support structure or the load-carrying apparatus, but is movably mounted by a bearing arrangement such that it is movable relative to the mast in response to mast vibrations, in particular to mast
(Continued)

vibrations having horizontal vibration components, in order to counteract mast vibrations.

14 Claims, 2 Drawing Sheets

(51) Int. Cl.

| | | |
|---|---|---|
| F16F 7/104 | (2006.01) | |
| F16F 7/08 | (2006.01) | |
| F16F 7/09 | (2006.01) | |
| F16F 7/112 | (2006.01) | |
| F16F 7/10 | (2006.01) | |
| B66F 9/07 | (2006.01) | |
| F16F 15/02 | (2006.01) | |
| B66F 9/10 | (2006.01) | |
| B66F 9/08 | (2006.01) | |
| B66F 9/14 | (2006.01) | |
| B66F 17/00 | (2006.01) | |

(52) U.S. Cl.
CPC ............ *B66F 9/07559* (2013.01); *B66F 9/08* (2013.01); *B66F 9/10* (2013.01); *B66F 9/147* (2013.01); *B66F 17/003* (2013.01); *F16F 7/08* (2013.01); *F16F 7/09* (2013.01); *F16F 7/10* (2013.01); *F16F 7/104* (2013.01); *F16F 7/1011* (2013.01); *F16F 7/1017* (2013.01); *F16F 7/112* (2013.01); *F16F 15/02* (2013.01); *B66F 9/0759* (2013.01); *F16F 2222/08* (2013.01)

(58) Field of Classification Search
USPC ........ 414/631, 619, 629, 641, 663, 719, 785
See application file for complete search history.

(56) References Cited

U.S. PATENT DOCUMENTS

| | | | |
|---|---|---|---|
| 4,218,170 | A | 8/1980 | Goodacre |
| 4,439,102 | A | 3/1984 | Allen |
| 5,657,834 | A | 8/1997 | Plaugher et al. |
| 7,736,115 | B2 | 6/2010 | Lambert |
| 7,980,807 | B2 | 7/2011 | Schoenauer |
| 8,078,368 | B2 | 12/2011 | Hall |
| 8,944,744 | B2 | 2/2015 | Kleeberger et al. |
| 9,403,667 | B2 | 8/2016 | Mccabe et al. |
| 9,890,025 | B2 | 2/2018 | Colantonio |
| 10,046,812 | B2 | 8/2018 | Schmalzl et al. |
| 10,266,379 | B2 | 4/2019 | Schottke et al. |
| 10,308,489 | B2 | 6/2019 | Magens et al. |
| 2005/0156391 | A1 | 7/2005 | Krenzin et al. |
| 2006/0182588 | A1 | 8/2006 | Beckett et al. |
| 2007/0116548 | A1 | 5/2007 | Cooper |
| 2009/0312875 | A1 | 12/2009 | Lehtonen et al. |
| 2009/0314582 | A1 | 12/2009 | Meijer |
| 2015/0040481 | A1* | 2/2015 | Stover ................. E04G 21/3223 49/50 |
| 2016/0214659 | A1 | 7/2016 | Schmalzl et al. |
| 2017/0313563 | A1 | 11/2017 | Magens et al. |
| 2017/0313565 | A1 | 11/2017 | Magens et al. |
| 2017/0327362 | A1 | 11/2017 | Schmalzl et al. |
| 2017/0369293 | A1 | 12/2017 | Schmalzl et al. |
| 2017/0369294 | A1 | 12/2017 | Magens et al. |

FOREIGN PATENT DOCUMENTS

| | | |
|---|---|---|
| DE | 8806324 | 8/1988 |
| DE | 3925668 | 2/1991 |
| DE | 4016497 | 11/1991 |
| DE | 4019075 | 12/1991 |
| DE | 10054789 | 5/2002 |
| DE | 10055751 | 5/2002 |
| DE | 10240851 | 5/2003 |
| DE | 102004002188 | 8/2005 |
| DE | 102004045698 | 3/2006 |
| DE | 602004001979 | 3/2007 |
| DE | 102008020592 | 10/2009 |
| DE | 102008020595 | 10/2009 |
| DE | 102013014094 | 3/2015 |
| DE | 102013113428 | 6/2015 |
| DE | 202015004375 | 4/2016 |
| DE | 102015201098 | 7/2016 |
| EP | 2368832 | 6/2013 |
| EP | 2881358 | 6/2015 |
| FR | 2243144 | 4/1975 |
| GB | 2379434 | 9/2004 |
| JP | H04130294 | 11/1992 |
| JP | 2004277068 | 10/2004 |
| JP | 2006160406 | 6/2006 |

OTHER PUBLICATIONS

U.S. Appl. No. 15/498,514, "Non-Final Office Action", dated Sep. 4, 2018, 13 pages.
U.S. Appl. No. 15/498,515, "Non-Final Office Action", dated Aug. 31, 2018, 12 pages.
U.S. Appl. No. 15/592,236, "Non-Final Office Action", dated Aug. 10, 2018, 11 pages.
German Application No. 102016207526.8, German Search Report dated Apr. 12, 2017.
German Application No. 102016211390.9, German Search Report dated May 18, 2017.
German Application No. 102016207523.3, German Search Report dated Apr. 11, 2017.
European Patent Application No. 17168717.1, Extended European Search Report dated Sep. 29, 2017.
European Patent Application No. 17168817.9, Extended European Search Report dated Oct. 17, 2017.
European Patent Application No. 17170608.8, Extended European Search Report dated Oct. 20, 2017.
European Patent Application No. 17173979.0, Extended European Search Report dated Oct. 20, 2017.
European Patent Application No. 17177385.6, Extended European Search Report dated Nov. 22, 2017.
European Patent Application No. 17178081.0, Extended European Search Report dated Nov. 24, 2017.
German Patent Application No. 10 2016 209 893.4, Search Report dated May 15, 2017.
German Patent Application No. 10 2016 208 205.1, German Search Report dated Apr. 28, 2017.
U.S. Appl. No. 15/631,096, "Non-Final Office Action", dated Nov. 16, 2018, 11 pages.
U.S. Appl. No. 15/498,514, "Final Office Action", dated Feb. 11, 2019, 11 pages.
U.S. Appl. No. 15/498,515, "Notice of Allowance", dated Feb. 13, 2019, 5 pages.
U.S. Appl. No. 15/592,236, "Notice of Allowance", dated Mar. 6, 2019, 7 pages.
U.S. Appl. No. 15/498,515, "Supplemental Notice of Allowance", dated Mar. 20, 2019, 2 pages.
U.S. Appl. No. 15/592,236, "Supplemental Notice of Allowability", dated May 13, 2019, 3 pages.
U.S. Appl. No. 15/631,096, "Notice of Allowance", dated Mar. 12, 2019, 5 pages.

* cited by examiner

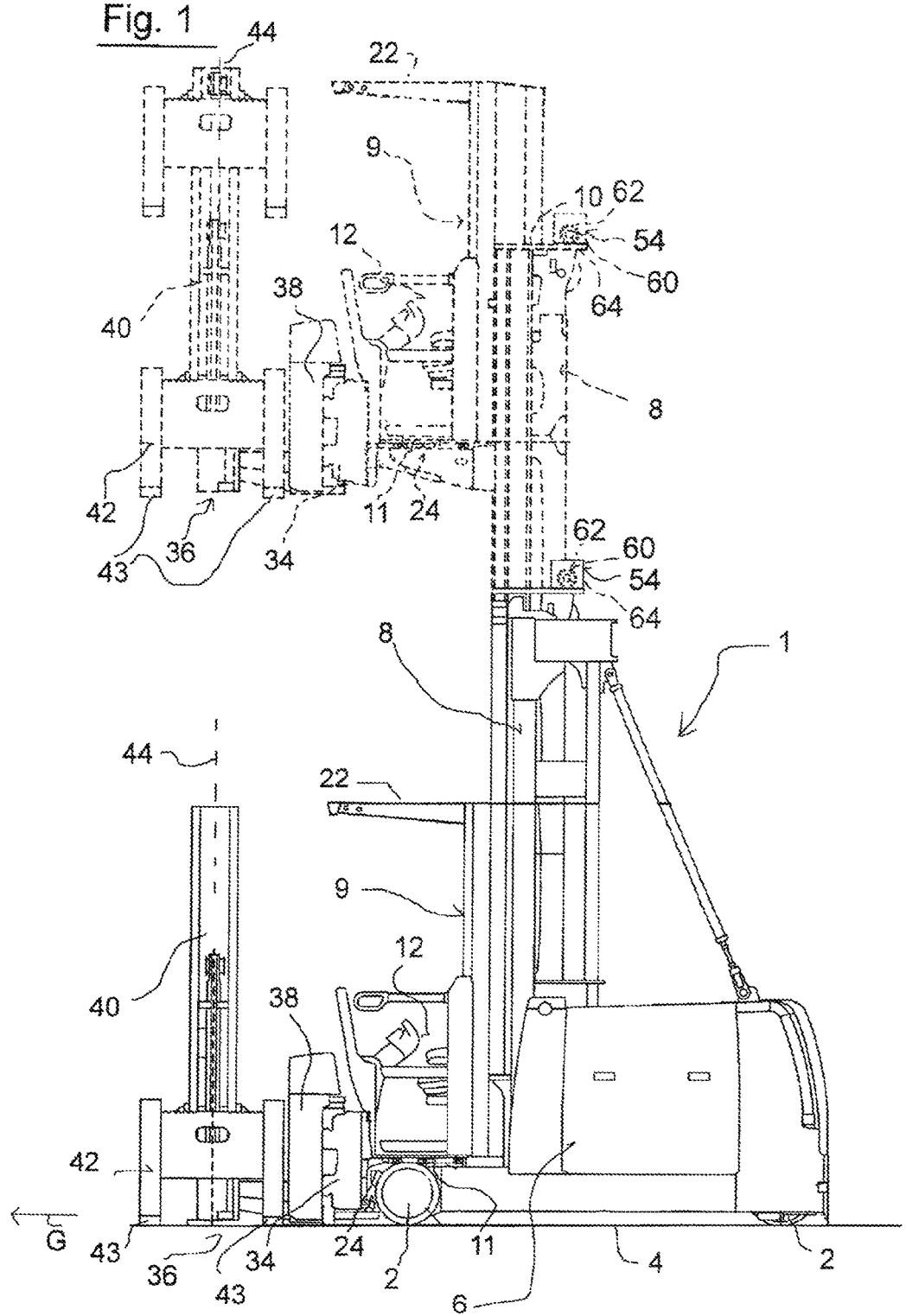

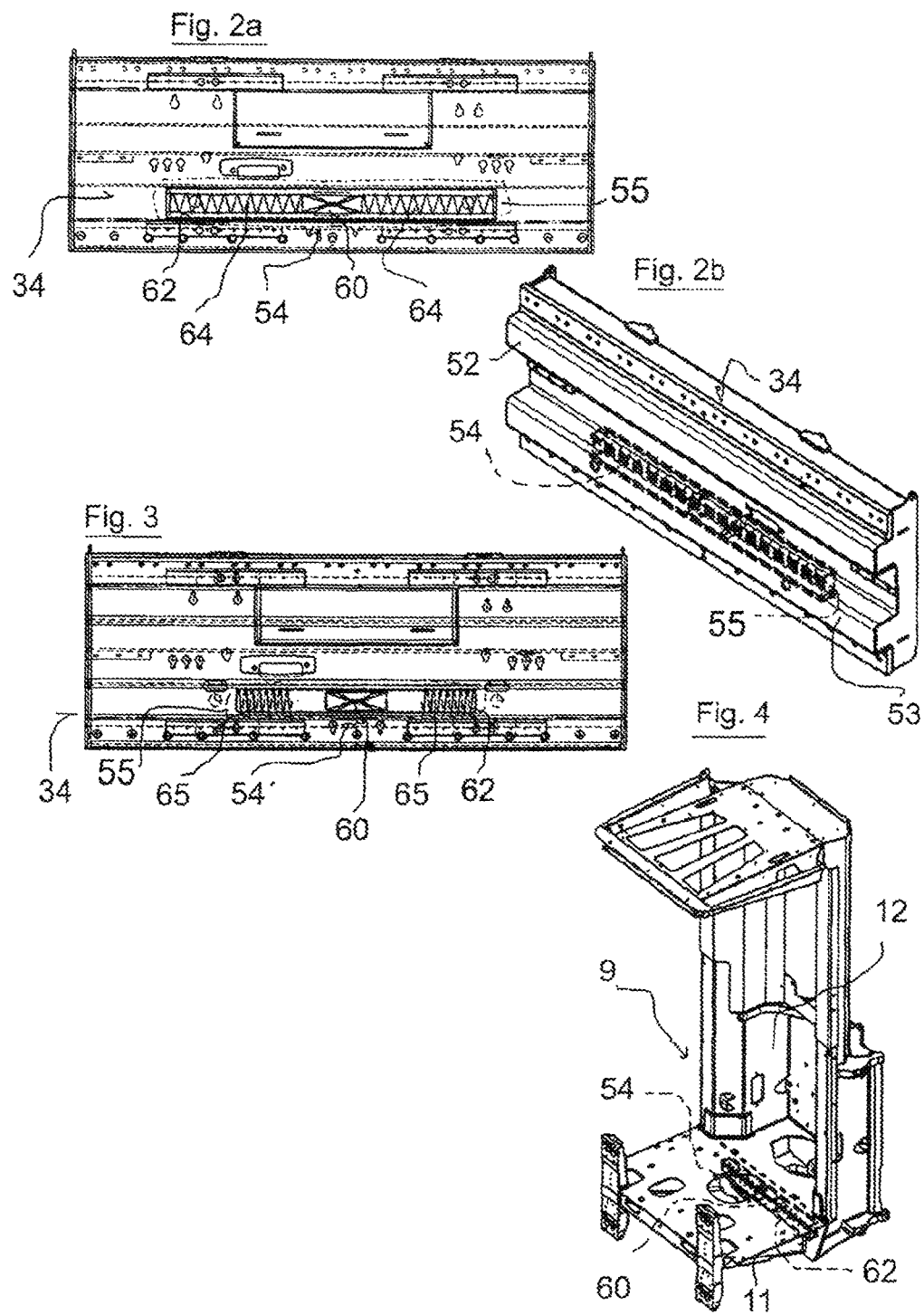

INDUSTRIAL TRUCK COMPRISING A DEVICE FOR REDUCING VIBRATIONS

CROSS REFERENCE TO RELATED APPLICATION

This application claims priority to German Patent Application No. 10 2016 209 893.4, filed in Germany on Jun. 6, 2016, the entire contents of which are hereby incorporated herein by this reference.

The invention relates to an industrial truck comprising a chassis, a mast arranged on the chassis in an upright position, a load-carrying apparatus, which has at least one load-receiving means for receiving a load that is to be transported, a support structure that supports the load-carrying apparatus on the mast and can be moved, together with the load-carrying apparatus, upwards and downwards on the mast, and comprising a device for reducing vibrations.

Industrial trucks according to the invention can be forklift trucks of various designs, it being possible to use the invention particularly advantageously for sideloaders and high-bay stacker trucks, in particular tri-lateral sideloaders for order picking, in which load-carrying fork arms for lateral push operations are orientated or can be oriented transversely to the straightforward direction of travel of the industrial truck. Using such sideloaders constructed as high-bay stacker trucks, the insertion and removal of whole pallets and the picking of individual items from the high bays can be combined effortlessly. High-bay stacker trucks of the type under consideration here include those in which a cab is arranged on the mast so as to be movable upwards and downwards by means of a cab carrier, a lateral push frame being provided on the front of the cab, which lateral push frame is movable upwards and downwards on the mast together with the cab and supports a load-carrying apparatus which is laterally movable back and forth, transversely to the straightforward direction of travel of the industrial truck. Since the cab and an operator located therein can be moved vertically on the mast together with the load-carrying apparatus, these types of industrial trucks are also called man-up trucks or man-up industrial trucks. In the case of various designs of man-up industrial trucks, the mast can be extended and retracted telescopically, the cab being fastened in a height-adjustable manner to the highest extendable telescopic stage of the mast. The load-carrying apparatus that is movably guided on the lateral push frame can comprise an additional mast having load-receiving means that can move upwards and downwards thereon relative to the cab, which load-receiving means are normally load-carrying arms or a load-carrying fork having such load-carrying arms. The additional mast is arranged on a pivoting pusher and is pivotable thereon by approximately 180° about a normally vertical axis such that the load-carrying fork fastened to the additional mast in a height-adjustable manner can be pivoted out of a position in which it is laterally oriented, transversely to the straightforward direction of travel of the industrial truck, into a position in which it is oriented in an opposing lateral position. The pivoting pusher is linearly guided on the lateral push frame.

A typical task for the industrial truck is, for example, to put a pallet comprising a load located thereon in a bay for storage, the industrial truck being located in a narrow aisle between bays of a high-bay warehouse and the pallet being received on the load-carrying fork. The pallet is inserted into the bay laterally, transversely to the straightforward direction of travel (normal main direction of travel) of the industrial truck, it being assumed that the load-carrying fork is already correctly oriented on the desired storage area so as to be oriented laterally towards the bay, and the pivoting pusher, together with the additional mast provided thereon, is located in a lateral end position at the end of the lateral push frame that is remote from the bay in question. The loaded pallet can then be inserted into the bay by means of a linear lateral movement of the pivoting pusher along the lateral push frame.

To drive the various movable components on the mast, various controllable drive means are provided. Depending on the features of the industrial truck, said drive means are used to move the load-receiving means on the additional mast, to pivot the additional mast about a vertical axis, to move the load-carrying apparatus and pivoting pusher on the lateral push frame, to move the driver's platform on the mast and optionally to telescopically extend and retract the mast and to move the lateral push frame relative to the cab. Normally and preferably, said means are hydraulic drive means, although other drives should not be ruled out.

It is a known problem that, in the case of industrial trucks of the kind under consideration here, vibrations on the mast, in particular vibrations having lateral vibrating components, i.e. vibrating components directed transversely to the straightforward direction of travel of the industrial truck, occur, in particular when travelling over an uneven surface. Such vibrations are often more intense the higher the cab and its devices, which are built on at the front, have been raised on the mast and the greater the load that may be received by means of the load-carrying apparatus. Such vibrational movements can be unpleasant for an operator located in the cab and make rapid travelling in the narrow aisle as well as the placement of pallets into bays and their retrieval from bays difficult or even sometimes impossible such that the operator can only begin a placement or retrieval procedure safely when the vibrations have subsided once the industrial truck is stationary. Alternatively, the operator could in principle drive the industrial truck at a reduced speed when travelling over uneven ground in order to largely prevent excitation of vibrations. Both of these would, however, reduce productivity when working with the industrial truck.

An industrial truck of the kind mentioned at the outset, which is designed as a man-up vehicle and in which measures to reduce vibrations have already been taken, is known from EP 2 368 832 B1. Said measures consist of an assembly described as a load-receiving portion, which is movable upwards and downwards on the mast and coherently comprises the cab and the load-carrying apparatus connected thereto, being attached to the mast such that it can collectively perform movements that are transverse to the straightforward direction of travel (main direction of travel) of the industrial truck and have a lateral, i.e. normally horizontal, movement component relative to the mast, a separate degree of movement freedom being established for the assembly for this purpose, which is not provided for the planned operation of the industrial truck. The known industrial truck has means for damping or preventing vibrations in the relative position between the load-receiving portion and the mast, i.e. between the cab and the mast. In this case, these can be active, semi-active and/or passive vibration-damping means, which are suitable for generating a force or torque between the mast and the load-receiving portion that has a component along the separate degree of movement freedom which is not provided for the planned operation of the industrial truck. In EP 2 368 832 B1, damping elements and springs, inter alia, are proposed for reducing vibrations, which elements and springs counteract deflection of the mast and the assembly described as the load-receiving portion along the separate degree of movement freedom. A disadvantage of this known solution is the relatively high assembly complexity in order to attach to the mast the entire assembly, which consists of the cab and all of the load-receiving components that are vertically movable on the mast together with said cab, whilst establishing the separate degree of movement freedom which is not provided for the planned operation of the industrial truck. Retrofitting an industrial truck of the type in question with these known vibration-reducing measures would also be complicated and costly.

The object of the invention is to provide an industrial truck of the type mentioned at the outset, which is equipped with vibration-reducing measures which are relatively easy to achieve in terms of assembly, in particular even in the case of retrofitting, and which allow for efficiently vibration-reducing operation.

According to the invention, an industrial truck having the features of claim 1 is proposed, in particular an industrial truck comprising a chassis, a mast arranged on the chassis in an upright position, a load-carrying apparatus, which has at least one load-receiving means for receiving a load that is to be transported, a support structure that supports the load-carrying apparatus on the mast and can be moved, together with the load-carrying apparatus, upwards and downwards on the mast, and comprising a device for reducing vibrations, the device for reducing vibrations having at least one additional mass body which is supported by the mast and is not constantly rigidly coupled to the mast or the support structure or the load-carrying apparatus, but is movably mounted by means of a bearing arrangement such that it is movable relative to the mast in response to mast vibrations, in particular to mast vibrations having horizontal vibration components, in order to counteract the mast vibrations.

An additional mass body in the context of the invention is to be understood to be a mass body that is a component of the device for reducing vibrations; therefore, it has no relevance in the case of corresponding industrial trucks not having such a device for reducing vibrations and is therefore not provided in these trucks either to have a corresponding function.

A basic concept of the invention is not to rigidly couple the additional mass body, i.e. the mass thereof, and the rest of the industrial truck, i.e. its mass, to one another such that the additional mass body can preferably only follow accelerated movements, which occur in the event of mast vibrations, indirectly or with a delay or phase shift, and kinetic energy is thereby converted into another form of energy, in particular heat, in order to counteract the mast vibrations.

The additional mass body is preferably formed from at least one metal block, for example a steel block, which has a relatively large mass of, for example, at least 50 kg, preferably at least 100 kg, while requiring as little space as possible.

The additional mass body and the bearing arrangement that mounts said mass body such that it can move relative to the mast and the components connected thereto can be provided at different positions in different embodiments of the invention.

For example, according to one embodiment of the invention, the bearing arrangement and the additional mass body can be arranged directly on the mast, preferably at a position in the upper half of the mast—in particular at the upper end of the mast. In the case of a telescopically extendable mast, the bearing arrangement and the additional mass body should be arranged at the highest extendable telescopic stage of the mast and be vertically movable together with said mast.

According to another embodiment of the invention, the bearing arrangement and the additional mass body can be supported by the support structure—and can be movable upwards and downwards on the mast together with said support structure. In this case, the bearing arrangement and the additional mass body can be provided directly on the support structure or on another component held by the support structure, for example on the load-carrying apparatus. In the case of a man-up industrial truck having a cab fastened to the support structure for movement upwards and downwards together therewith, the cab, in particular the frame of said cab, can be such a component. Such a bearing arrangement comprising an additional mass body can advantageously be accommodated, for example, in the base region of the cab, preferably underneath the cab.

According to a particularly preferred embodiment of the invention, the industrial truck is designed as a sideloader, in particular as a tri-lateral sideloader, the support structure having a lateral push frame on which a lateral push device, which is connected to the load-carrying apparatus, is mounted for combined lateral movement with the load-carrying apparatus, transversely to the normal straightforward direction of travel of the industrial truck, and can be driven by means of a lateral push drive apparatus, the bearing arrangement that mounts the additional mass body such that it can move relative to the mast and the additional mass body preferably being arranged on the lateral push frame. As already described above, however, other positions for positioning the bearing arrangement comprising the additional mass body can alternatively or additionally be taken into consideration.

According to a preferred embodiment of the invention, the bearing arrangement is a linear bearing arrangement, which allows for horizontal movement of the additional mass body, preferably transversely to the normal main direction of travel of the industrial truck in order to reduce lateral vibrations, in particular, of the mast, i.e. vibrations having horizontal vibration components transverse to the normal main direction of travel of the industrial truck. Said bearing arrangement can be a sliding bearing, roller bearing or the like in this case.

In another embodiment of the invention, the bearing arrangement comprises a self-aligning bearing, which allows for a pendulum movement of the additional mass body preferably in a plane that is transverse to the normal straightforward direction of travel of the industrial truck. In this case, the additional mass body constitutes the main part of the pendulum mass.

End stops can be provided in order to limit the movement range of the additional mass body relative to the mast. Passive and/or actively operable reset means can also be provided, which are used to move the additional mass body back into a target zero position (central position) should it stop outside of said target zero position at the end of a vibration-reducing procedure.

The device for reducing vibrations preferably has a passive and/or active damping system, which influences the movement of the additional mass body relative to the mast. In a very simple case of a passive damping system, said passive damping system can be a friction-damping system comprising a friction-damping arrangement, which has a braking effect on movements of the additional mass body relative to the mast. Friction-damping arrangements can have various designs, for example by providing increased bearing friction in the bearing arrangement of the additional mass body.

According to one embodiment of the invention, the damping system comprises at least one hydraulic and/or pneumatic friction-damping cylinder. Such a friction-damping cylinder comprising two cylinder chambers separated by a piston, which is axially movable therein, can be hydraulically connected, for example, such that the two cylinder chambers are short-circuited by means of a hydraulic throttle point. Furthermore, such a friction-damping cylinder can, for example, be combined with a hydropneumatic spring-type accumulator arrangement, which counteracts displacement of the piston of the friction-damping cylinder out of a zero position.

It is generally advantageous for such damping systems, in particular friction-damping systems, to have at least one spring arrangement, which is designed to force the additional mass body back towards the target zero position in the event of its displacement out of a target zero position. Such a spring arrangement can, for example, comprise at least one mechanical spring and/or, as already described above, at least one hydropneumatic spring-type accumulator.

Should a movement of the additional mass body relative to the mast be braked to a standstill outside of the target zero position as a result of friction (or, if applicable, against a stop), then the friction brake concerned could be released, if applicable, such that the additional mass body can be brought back into the target zero position by means of spring force and/or by an actuator without a particularly great exertion of force.

According to another embodiment of the invention, the damping system comprises at least one active component, in particular at least one controllable hydraulic and/or pneumatic cylinder and/or at least one controllable electric motor, preferably a servomotor, and/or at least one electromagnet, the active component of the damping system being designed to actively move the additional mass body in a manner so as to reduce mast vibrations. According to one embodiment of the invention, the mass of the additional mass body, which mass is decoupled from or not rigidly coupled to (and in this sense "soft"-coupled to) the mast and the components connected thereto in order to reduce vibrations, is actively and dynamically tendentially held in its zero position.

A control device is provided in an active system in order to control the active component(s). Furthermore, sensors can be provided which detect vibration amplitudes of the mast and/or components arranged thereon in a height-adjustable manner, it being possible for the control device to process data from said sensors in order to control the active component(s) in the sense of optimised vibration reduction. In this sense, at least one sensor can also be provided, which detects the movement of the additional mass body relative to its bearing arrangement or to the mast and the components connected thereto.

According to one embodiment of the invention, the device for reducing vibrations can be selectively activatable and deactivatable. For this purpose, a controllable locking apparatus can be provided, for example, which, when the device for reducing vibrations is deactivated, substantially rigidly couples the additional mass body to the bearing arrangement relative to the mast and the components connected thereto, and which releases the additional mass body from the rigid coupling when the device for reducing vibrations is activated.

In a particularly advantageous variant of such an embodiment of the invention, the device for reducing vibrations is automatically activatable and deactivatable depending on the particular operating state of the industrial truck and/or depending on the industrial truck being stopped in certain surroundings, for example in a narrow aisle. The device for reducing vibrations can therefore be controlled by means of a control device, for example depending on the acceleration of travel (including transverse acceleration) and/or speed of travel of the industrial truck, on the particular lifting height of the support structure and the load-carrying apparatus, on the mass of the load received by the industrial truck, on the orientation of load-carrying fork arms, on impacts, for example when the ground is uneven, on the stopping place and surroundings of the industrial truck, for example when said truck is located in a narrow aisle of a high-bay warehouse, etc., sensors or other means for detecting these parameters being provided, which interact with the control device of the industrial truck that controls the device for reducing vibrations. For example, it can thus be provided for the control device to change the "rigidity or hardness" of the coupling between the additional mass body and the bearing arrangement or the element of the industrial truck rigidly connected to the bearing arrangement, depending on one or more of the aforementioned parameters. The lower the need for reducing vibrations, the more rigid or harder said coupling can be.

If it is only intended for the device for reducing vibrations to reduce transverse vibrations, for example, it can be provided for said device to be controllable depending on the orientation of load-carrying fork arms and/or depending on the lifted vertical position of the load-carrying fork arms and/or only when the industrial truck has stopped in the narrow aisle, such that it operates in the narrow aisle when the load-carrying fork arms are positioned transversely to the straightforward direction of travel of the industrial truck, for example.

Embodiments of the invention will be described below with reference to the Figs., in which.

FIG. 1 is a side view of an embodiment of an industrial truck according to the invention, which is designed as a tri-lateral high-bay stacker.

FIG. 2a and FIG. 2b are a rear view (FIG. 2a) and a perspective view (FIG. 2b) of a lateral push frame of an industrial truck of the design shown in FIG. 1, comprising an additional mass body, which is provided on the lateral push frame and has a spring centering device in a linear sliding bearing.

FIG. 3 is a rear view of a corresponding lateral push frame comprising an additional mass body, which is provided on said frame and the movement of which in a linear sliding bearing can be electromagnetically influenced.

FIG. 4 is a perspective view of a cab frame of an industrial truck of the design shown in FIG. 1, comprising an additional mass body provided in the base region of the cab frame.

According to FIG. 1, the industrial truck which is designed as a tri-lateral high-bay stacker comprises a chassis 6 supported by means of wheels 2 on the ground 4 and a mast 8 vertically fastened to the chassis 6. The mast 8 is constructed of multiple parts so as to be telescopically extendable, as can be seen from FIG. 1 by the extended position indicated by dashed lines. At the furthest extendable telescopic stage 10 of the mast 8, a support structure 9 in the form of a cab carrier is attached such that it can move vertically. The support structure 9 has a cantilever arrangement 24 in the form of a boom, which projects forwards from the mast 8 in the main direction of travel G of the industrial truck and braces the underneath of a platform 11 of a cab 12 and supports a lateral push frame 34 at its projecting end.

The cab 12 is designed as a lifting driver's cabin, which has a frame comprising the cab platform 11 as the cabin floor, a back wall, side walls and a driver overhead guard 22. At the front of the cab 12, the lateral push frame 34 is fixed to the cantilever arrangement 24.

A lateral push device 38 constructed as a pivoting pusher is arranged on the lateral push frame 34 so as to be laterally movable, transversely to the straightforward direction of travel G of the industrial truck. The lateral push device 38 is connected to a load-carrying apparatus 36, which has an additional mast 40 arranged on the front of the lateral push device 38, on which additional mast a load-carrying fork 42 having a fork-carrying arrangement is vertically movable in the form of load-carrying element. The additional mast 40 can be pivoted together with the load-carrying fork 42 about the vertical axis 44 between the position shown in FIG. 1, in which the load-carrying fork 42 and its load-carrying arms 43 are oriented laterally (transverse orientation to the left in relation to the straightforward direction of travel G), and a position in which they are oriented in an opposing lateral position (transverse orientation to the right) of the load-carrying arms 43.

The special feature of the industrial truck is a device 54 for reducing vibrations, which is designed in particular to reduce and to dampen vibrations having horizontal deflection components transverse to the main direction of travel G of the industrial truck. In the embodiment according to FIG. 1, the device 54 for reducing vibrations is arranged on the upper edge of the furthest extendable telescopic stage 10 of the mast 8. It is indicated purely schematically in FIG. 1 and, in its simplest form, comprises a linear sliding bearing as the bearing arrangement 62, having an additional mass body 60, which is guided thereby to move horizontally, transversely to the main direction of travel G of the industrial truck and a vibration-damping system influencing the movement of the additional mass body 60 relative to the mast 8. In principle, the device 54 for reducing vibrations can be designed in the manner that is described below with reference to FIGS. 2a to 4, for example.

The additional mass body 60 can and should have a quite considerable mass of, for example, at least 50 kg, preferably at least 100 kg, in order to constitute an efficient counter-momentum mass when mast vibrations occur. It expediently consists of a material of high density, in order to keep the volume and space required therefor as low as possible. According to one embodiment of the invention, the additional mass body consists of at least one metal block.

The bearing arrangement 62 can, for example, be designed as a sliding bearing and/or as a roller bearing, etc. and, as part of the device 54 for reducing vibrations, constitutes an interface between the additional mass body and the mast 8, which allows for vibration-reducing movements of the additional mass body 60 relative to the mast 8, which movements have horizontal movement components transverse to the main direction of travel (straightforward direction of travel) G of the industrial truck.

The vibration-damping system, which in the simplest form is passive, can be active or semi-active in other embodiments.

At least in the passive variant, said vibration-damping system preferably comprises a friction-damping arrangement, which has a braking effect on the movement of the additional mass body relative to the mast 8, in order to convert kinetic energy into another form of energy, in particular heat, such that vibrations of the industrial truck, in particular of the mast 8, are damped. Such a friction-damping arrangement can, for example, comprise friction surfaces that are provided with friction linings and rub against one another. A hydraulic cylinder comprising, for example, cylinder chambers short-circuited by means of a throttle point and optionally a pneumatic or hydropneumatic spring-type accumulator connected thereto, can also be an element of the damping system. In a preferred embodiment, the damping system can comprise a spring arrangement, for example a mechanical spring arrangement, which counteracts deflection of the additional mass body relative to the bearing arrangement and to the mast with a resilient reset tendency.

It should be pointed out that, according to variants of the damping system, the rigidity of spring arrangements of the damping system and/or the frictional effect of friction-damping arrangements can be controllable depending on certain operating parameters or operating conditions of the industrial truck, in order to modulate the vibration-damping effect as required.

One application example: while the industrial truck is travelling in a narrow aisle of a high-bay warehouse, the device for reducing vibrations would, for example, be activated, a friction-damping arrangement of the damping system providing a frictional effect adapted to the current situation. If, when the industrial truck is travelling over uneven ground, transverse acceleration occurs at the mast 8 and therefore at the additional mass body, the transverse acceleration is transferred to the additional mass body via the bearing arrangement, the friction-damping arrangement and a spring arrangement of the damping system interacting with said friction-damping arrangement. If the inertial force of the relevant "decoupled or soft-coupled" masses exceeds the value of the adjusted frictional force and the spring force acting in parallel, relative movement occurs between the additional mass body and its bearing arrangement and the mast 8. This relative movement backwards and forwards relative to a target zero position reduces the overall vibration amplitude of the mast 8 and kinetic energy is primarily converted into heat in the friction-damping arrangement.

In one corresponding variant, the damping system can have at least one actuator in the form of an active component in addition to or alternatively to passive components. Such an actuator can, for example, be formed by a controllable hydraulic or pneumatic cylinder or a controllable electric motor or by an electromagnetic arrangement, and acts between the additional mass body and the bearing arrangement mounting said additional mass body and the mast 8 in order to force the additional mass body 60 back in the event of its deflection out of its target zero position.

A control device is provided in such an active system in order to control the active components. Furthermore, sensors can be provided which detect the vibration amplitudes of the mast or components arranged thereon in a height-adjustable manner, it being possible for the control device to process data from said sensors in order to control the active components in the sense of optimised vibration reduction. In this sense, sensors can also be provided which detect the relative movement of the additional mass body to the bearing arrangement that mounts said additional mass body and to the mast 8.

The lateral push frame 34 of an industrial truck of the design shown in FIG. 1 is shown in isolation in FIGS. 2a and 2b. A corresponding industrial truck equipped with said lateral push frame constitutes a further embodiment of the invention in that the device 54 for reducing vibrations is provided on or integrated in the lateral push frame 34. In this case, the device 54 for reducing vibrations can be moved vertically on the mast together with the lateral push frame 34 and the support structure 9.

The lateral push frame 34 has horizontal cross rails 52, 53, which are arranged on top of one another, project forwards and extend horizontally, transversely to the normal main direction of travel G of the industrial truck, the device 54 for reducing vibrations being accommodated in a hollow space 55 in the lower cross rail 53. In FIG. 2a, an additional mass body 60 of said device for reducing vibrations can be seen in a linear sliding bearing 62, inside the hollow space 55 that is shown partly open at the rear, which bearing allows for relative movement of the additional mass body 60 along the lower cross rail 53 relative to the lateral push frame 34. The additional mass body 60 and the sliding bearing 62 are provided with friction surfaces which touch each other such that the additional mass body 60 experiences a braking effect as a result of friction during its movements within the sliding bearing 62 which are triggered in the case of transverse vibrations of the mast. This converts kinetic energy into heat.

According to FIG. 2a, the additional mass body 60 is located in a target zero position (central position), which it normally assumes in the absence of vibrations of the mast. On either side of the additional mass body 60, mechanical return springs 64 are provided in the slide bearing 62, one axial end of which springs rests on the additional mass body 60 and the other axial end of which springs rests on a particular axial end of the sliding bearing 62. The return springs 64 are designed to pretension the additional mass body 60 towards its target zero position such that the additional mass body 60 is forced back towards its target zero position by means of the return springs 64 in the event of any displacement out of the target zero position.

FIG. 3 shows a corresponding lateral push frame 34 in a perspective view corresponding to FIG. 2a, comprising a device 54' for reducing vibrations which is likewise accommodated in the hollow space 55 in the lower cross rail 53. The device 54' for reducing vibrations in FIG. 3 comprises active adjusting means for influencing the movement of the additional mass body 60 relative to the lateral push frame 34. These adjusting means are electromagnets 65, which are controllable by means of a control device (not shown), in order to accelerate or decelerate the additional mass body 60, which is linearly guided horizontally in the bearing arrangement 62, transversely to the normal main direction of travel G of the industrial truck concerned, this occurring, for example, depending on sensor information regarding the vibration state of the mast of the industrial truck concerned in a manner that dampens vibrations of the mast. The bearing arrangement 62 can be configured as a low-friction sliding bearing.

Instead of an electromagnet arrangement of the type indicated in FIG. 3, hydraulic cylinders or electric motors, for example, can also be considered as adjusting means.

FIG. 4 shows a support structure 9 in isolation in the form of a cab carrier of an industrial truck of the design shown in FIG. 1. An industrial truck equipped therewith constitutes another embodiment of the invention in that a device 54 for reducing vibrations is arranged underneath the cab platform 11, which is supported on the support structure 9, in the base region of the cab, preferably on the support structure 9. In this example, the device 54 is a passive system as is also shown in FIG. 2a. An active vibration-damping system could also be accommodated just as well in the installation position according to FIG. 4, as is shown in FIG. 3.

It should be pointed out that an industrial truck according to the invention can have a plurality of devices 54 for reducing vibrations, it being possible for these devices 54 to be accommodated at different points, such as those shown in the embodiments. In this case, these can be active and/or passive vibration-reducing systems.

The invention claimed is:

1. An industrial truck comprising:
    a chassis,
    a mast arranged on the chassis in an upright position, a load-carrying apparatus, which has at least one load-receiving means for receiving a load that is to be transported,
    a support structure that supports the load-carrying apparatus on the mast and can be moved, together with the load-carrying apparatus, upwards and downwards on the mast, and comprising
    a device for reducing vibrations,
    wherein the device for reducing vibrations has at least one additional mass body which is supported by the mast and is not constantly rigidly coupled to the mast or the support structure or the load-carrying apparatus, and is movably mounted by means of a bearing arrangement such that the at least one additional mass body is movable relative to the mast in response to mast vibrations in order to counteract mast vibrations, wherein the device for reducing vibrations has at least one damping system that influences a movement of the at least one additional mass body relative to the mast, wherein the at least one damping system is a passive damping system or an active damping system.

2. The industrial truck of claim 1, wherein the at least one damping system comprises a friction-damping arrangement.

3. The industrial truck of claim 1, wherein the at least one damping system comprises at least one of a hydraulic friction-damping cylinder or a pneumatic friction-damping cylinder.

4. The industrial truck of claim 1, wherein the at least one damping system comprises a spring arrangement.

5. The industrial truck of claim 4, wherein the spring arrangement comprises at least one of a mechanical spring or a hydropneumatic accumulator arrangement.

6. The industrial truck of claim 1, wherein the at least one damping system comprises at least one active component, the active component of the damping system directly or indirectly acting between the at least one additional mass body and the mast and components connected thereto in order to apply pressure to the at least one additional mass body in a manner that reduces mast vibrations.

7. The industrial truck of claim 6, wherein the at least one active component comprises one or more of a controllable hydraulic cylinder, a controllable pneumatic cylinder, a controllable electric motor, or an electromagnetic arrangement.

8. The industrial truck of claim 7, wherein the at least one active component comprises a controllable electric motor, and the controllable electric motor is a servomotor.

9. An industrial truck comprising
    a chassis,
    a mast arranged on the chassis in an upright position, a load-carrying apparatus, which has at least one load-receiving means for receiving a load that is to be transported,
    a support structure that supports the load-carrying apparatus on the mast and can be moved, together with the load-carrying apparatus, upwards and downwards on the mast, and comprising
    a device for reducing vibrations, wherein the device for reducing vibrations has at least one additional mass body which is supported by the mast and is not constantly rigidly coupled to the mast or the support structure or the load-carrying apparatus, and is movably mounted by means of a bearing arrangement such that the at least one additional mass body is movable relative to the mast in response to mast vibrations in order to counteract mast vibrations, wherein the bearing arrangement which mounts the at least one additional mass body such that the at least one additional mass body is movable relative to the mast, such that the at least one additional mass body is either (i) directly arranged on the mast at a position on an upper half of the mast, or (ii) supported by the support structure and can be moved upwards and downwards on the mast together therewith.

10. The industrial truck of claim 9, wherein the position of the bearing arrangement on the upper half of the mast is at an upper end of the mast.

11. The industrial truck of claim 9, wherein the bearing arrangement that mounts the at least one additional mass body such that the at least one additional mass body that is movable relative to the mast is arranged directly on at least one of the support structure or the load-carrying apparatus.

12. The industrial truck of claim 9, wherein a cab is fastened to the support structure and is movable upwards and downwards on the mast together with support structure, the bearing arrangement that mounts the at least one additional mass body such that the at least one additional mass body that is movable relative to the mast is arranged on the cab.

13. An industrial truck comprising
a chassis,
a mast arranged on the chassis in an upright position, a load-carrying apparatus, which has at least one load-receiving means for receiving a load that is to be transported,
a support structure that supports the load-carrying apparatus on the mast and can be moved, together with the load-carrying apparatus, upwards and downwards on the mast, and comprising
a device for reducing vibrations,
wherein the device for reducing vibrations has at least one additional mass body which is supported by the mast and is not constantly rigidly coupled to the mast or the support structure or the load-carrying apparatus, and is movably mounted by means of a bearing arrangement such that the at least one additional mass body is movable relative to the mast in response to mast vibrations in order to counteract mast vibrations, wherein the industrial truck is designed as a sideloader, the support structure having a lateral push frame on which a lateral push device, which is connected to the load-carrying apparatus, is mounted for combined lateral movement with the load-carrying apparatus, transversely to a normal main direction of travel of the industrial truck, and can be driven by means of a lateral push drive apparatus, the bearing arrangement that mounts the at least one additional mass body such that the at least one additional mass body can move relative to the mast being arranged on the lateral push frame.

14. An industrial truck comprising
a chassis,
a mast arranged on the chassis in an upright position, a load-carrying apparatus, which has at least one load-receiving means for receiving a load that is to be transported,
a support structure that supports the load-carrying apparatus on the mast and can be moved, together with the load-carrying apparatus, upwards and downwards on the mast, and comprising
a device for reducing vibrations,
wherein the device for reducing vibrations has at least one additional mass body which is supported by the mast and is not constantly rigidly coupled to the mast or the support structure or the load-carrying apparatus, and is movably mounted by means of a bearing arrangement such that the at least one additional mass body is movable relative to the mast in response to mast vibrations in order to counteract mast vibrations, wherein the device for reducing vibrations is selectively activatable and deactivatable, wherein the device for reducing vibrations is automatically activatable and deactivatable depending on surroundings of the industrial truck.

* * * * *